US011906015B2

United States Patent
Deferme

(10) Patent No.: US 11,906,015 B2
(45) Date of Patent: Feb. 20, 2024

(54) DAMPER WITH A SLANTED ELLIPTICAL SEAL BETWEEN AN INTERMEDIATE TUBE AND AN INNER PRESSURE TUBE

(71) Applicant: DRIV Automotive Inc., Southfield, MI (US)

(72) Inventor: Stefan Deferme, Heusden-Zolder (BE)

(73) Assignee: DRiV Automotive Inc., Northville, MI (US)

( * ) Notice: Subject to any disclaimer, the term of this patent is extended or adjusted under 35 U.S.C. 154(b) by 37 days.

(21) Appl. No.: 17/567,291

(22) Filed: Jan. 3, 2022

(65) Prior Publication Data
US 2023/0213080 A1   Jul. 6, 2023

(51) Int. Cl.
*F16F 9/36* (2006.01)
*F16F 9/18* (2006.01)
*B60G 17/08* (2006.01)

(52) U.S. Cl.
CPC ............... *F16F 9/369* (2013.01); *F16F 9/18* (2013.01); *B60G 17/08* (2013.01);
(Continued)

(58) Field of Classification Search
CPC .......... F16F 9/369; F16F 9/18; F16F 2222/12; F16F 2228/066; F16F 2232/08;
(Continued)

(56) References Cited

U.S. PATENT DOCUMENTS 4,997,009 A * 3/1991 Niikura .............. B60G 17/0424
138/30
5,586,569 A * 12/1996 Hanning ................ G05D 16/02
137/484.8
(Continued)

FOREIGN PATENT DOCUMENTS

CN      201110338 Y    9/2008
DE  102005053394 A1    5/2006
(Continued)

OTHER PUBLICATIONS

International Search Report and Written Opinion regarding International Patent Application No. PCT/US2022/050845, dated Apr. 25, 2023.

*Primary Examiner* — Robert A. Siconolfi
*Assistant Examiner* — James K Hsiao
(74) *Attorney, Agent, or Firm* — Harness, Dickey & Pierce, P.L.C.

(57) ABSTRACT

A damper including inner and outer tubes is provided. A piston is slidably disposed within the inner tube. An intermediate tube is positioned radially between the inner and outer tubes. The intermediate tube extends between first and second intermediate tube ends. An intermediate channel is disposed radially between the intermediate and inner tubes. A slanted elliptical seal is positioned inside the intermediate channel and divides the intermediate channel into first and second intermediate channel portions. A first control valve is in fluid communication with the second intermediate channel portion via a first intermediate tube opening. A second control valve is in fluid communication with the first intermediate channel portion via a second intermediate tube opening. The slanted elliptical seal abuts the intermediate tube between the first intermediate tube opening and the first intermediate tube end and between the second intermediate tube opening and the second intermediate tube end.

20 Claims, 10 Drawing Sheets

(52) U.S. Cl.
CPC ...... *B60G 2202/24* (2013.01); *B60G 2204/62* (2013.01); *B60G 2206/41* (2013.01); *B60G 2500/11* (2013.01); *B60G 2800/162* (2013.01); *F16F 2222/12* (2013.01); *F16F 2228/066* (2013.01); *F16F 2232/08* (2013.01); *F16F 2234/02* (2013.01)

(58) Field of Classification Search
CPC .. F16F 2234/02; F16F 9/20; F16F 9/34; F16F 9/44; F16F 9/38; B60G 17/08; B60G 13/08; B60G 2202/24; B60G 2206/41; B60G 2500/11; B60G 2800/162
See application file for complete search history.

(56) References Cited

U.S. PATENT DOCUMENTS

| | | | | |
|---|---|---|---|---|
| 5,586,627 A * | 12/1996 | Nezu | ............ | F16F 9/46 |
| | | | | 188/266.6 |
| 5,788,030 A * | 8/1998 | Rottenberger | ............ | F16F 9/34 |
| | | | | 188/290 |
| 5,823,699 A * | 10/1998 | Austin, Jr. | ............ | F16B 7/149 |
| | | | | 403/368 |
| 5,961,160 A * | 10/1999 | Frohlich | ............ | F16L 19/10 |
| | | | | 285/915 |
| 6,102,171 A | 8/2000 | Rottenberger et al. | | |
| 6,224,114 B1 * | 5/2001 | Franzen | ............ | F16L 13/142 |
| | | | | 285/104 |
| 6,321,888 B1 * | 11/2001 | Reybrouck | ............ | F16F 9/325 |
| | | | | 188/313 |
| 6,371,530 B1 * | 4/2002 | Sato | ............ | F16L 21/08 |
| | | | | 285/379 |
| 7,942,165 B2 * | 5/2011 | Katsura | ............ | F16L 41/086 |
| | | | | 137/884 |
| 8,613,348 B2 | 12/2013 | Hamers et al. | | |
| 9,777,875 B2 * | 10/2017 | Bobo | ............ | F16L 37/091 |
| 10,012,283 B2 * | 7/2018 | Yamashita | ............ | F16F 9/486 |
| 10,379,549 B2 * | 8/2019 | Svejnoha | ............ | G05D 16/08 |
| 10,400,849 B2 | 9/2019 | Manger et al. | | |
| 10,678,273 B2 * | 6/2020 | Hess | ............ | F15B 13/024 |
| 11,512,758 B2 * | 11/2022 | Lun, II | ............ | F16F 9/369 |
| 2005/0121273 A1 | 6/2005 | Hamers | | |
| 2006/0131118 A1 * | 6/2006 | Huang | ............ | F16F 9/461 |
| | | | | 188/313 |
| 2006/0283677 A1 * | 12/2006 | Schmidt | ............ | F16F 9/325 |
| | | | | 188/322.19 |
| 2017/0313151 A1 * | 11/2017 | Reimann | ............ | F16F 9/3235 |
| 2017/0349020 A1 * | 12/2017 | Kasprzyk | ............ | F16F 9/3235 |
| 2018/0231099 A1 * | 8/2018 | Matsumoto | ............ | F16F 15/173 |
| 2018/0355940 A1 * | 12/2018 | Manger | ............ | F16F 9/369 |
| 2020/0173513 A1 | 6/2020 | Woenarta | | |
| 2020/0232532 A1 * | 7/2020 | Ruhmann | ............ | F16F 9/46 |
| 2021/0131522 A1 * | 5/2021 | Lun, II | ............ | F16F 9/369 |
| 2021/0164533 A1 * | 6/2021 | Zeissner | ............ | F16F 9/32 |
| 2021/0283974 A1 | 9/2021 | Kim | | |
| 2022/0316546 A1 * | 10/2022 | Schmitt | ............ | F16F 9/062 |

FOREIGN PATENT DOCUMENTS

| | | |
|---|---|---|
| DE | 102017220081 A1 | 5/2019 |
| DE | 102019206455 A1 | 11/2020 |
| WO | WO-2022112185 A1 | 6/2022 |

* cited by examiner

DAMPER WITH A SLANTED ELLIPTICAL SEAL BETWEEN AN INTERMEDIATE TUBE AND AN INNER PRESSURE TUBE

FIELD

The present disclosure generally relates to dampers. More particularly, the present disclosure relates to dampers with multiple external control valves.

BACKGROUND

This section provides background information related to the present disclosure which is not necessarily prior art.

Vehicles generally include dampers that are used in conjunction with suspension systems to absorb vibrations and bumps during driving. In order to absorb vibration and bumps, dampers are generally connected between a body and the suspension system of the vehicle. A piston is located within the damper and separates a first working chamber and a second working chamber. The piston is connected to the vehicle body or the suspension of the vehicle through a piston rod. One or more control valves may control the flow of fluid during extension/rebound and compression strokes of the piston. Control valves are typically externally mounted to the damper.

When more than one control valve is provided, the control valves may be externally mounted to one side of the damper in a side-by-side arrangement or on opposite sides of the damper in a longitudinally staggered arrangement. This is because the longitudinal position of the control valves, when mounted to opposite sides of the damper, is often limited by the internal components of the damper. In current damper designs, two control valves may not be mounted to the damper at the same height or longitudinal position. As a result, the damper occupies more packaging space and leads to further complexity within the suspension system.

SUMMARY

This section provides a general summary of the disclosure, and is not a comprehensive disclosure of its full scope or all of its features.

In accordance with one aspect of the present disclosure, a damper is provided. The damper includes an inner tube that extends longitudinally between a first inner tube end and a second inner tube end along a longitudinal axis. The damper includes a piston assembly including a piston that is slidably disposed within the inner tube to define a first working chamber and a second working chamber. The damper also includes an outer tube that is disposed annularly around the inner tube and extends longitudinally between a first outer tube end and a second outer tube end. An intermediate tube is disposed annularly about the inner tube and positioned radially between the inner tube and the outer tube. The intermediate tube extends longitudinally between a first intermediate tube end and a second intermediate tube end. Additionally, the intermediate tube includes a first intermediate tube opening and a second intermediate tube opening that extend radially through the intermediate tube. An intermediate channel is disposed radially between the intermediate tube and the inner tube and a reservoir chamber is disposed radially between the intermediate tube and the outer tube.

The damper includes a slanted elliptical seal that is positioned inside the intermediate channel and divides the intermediate channel into a first intermediate channel portion and a second intermediate channel portion. A first control valve is arranged in fluid communication with the second intermediate channel portion via the first intermediate tube opening. Additionally, a second control valve is arranged in fluid communication with the first intermediate channel portion via the second intermediate tube opening. The slanted elliptical seal is positioned at an oblique angle relative to the longitudinal axis such that the slanted elliptical seal abuts the intermediate tube between the first intermediate tube opening and the first intermediate tube end and abuts the intermediate tube between the second intermediate tube opening and the second intermediate tube end.

In accordance with another aspect of the present disclosure, the damper may further include a piston valve and a base valve assembly. The base valve assembly includes a base valve body and a base valve. The base valve body has projections that abut the second outer tube end to define a fluid transport chamber that is positioned between the second outer tube end and the base valve body. In addition, the first control valve has a first control valve inlet and a first control valve outlet. The second control valve has a second control valve inlet and a second control valve outlet.

In accordance with another aspect of the present disclosure, the damper may further include a first cover member and a second cover member. The first cover member is attached to the outer tube such that a first collector chamber is defined between the first cover member and the outer tube. The first control valve is externally mounted to the first cover member. The second cover member is attached to the outer tube such that a second collector chamber is defined between the second cover member and the outer tube. The second control valve is externally mounted to the second cover member.

Advantageously, the damper design disclosed, with its slanted elliptical seal, allows for the first and second control valves to be positioned at diametrically opposed locations on the outer tube. The disclosed damper design can therefore be more easily packaged within the suspension system and is well suited for a wide spectrum of vehicles compared to other damper designs.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
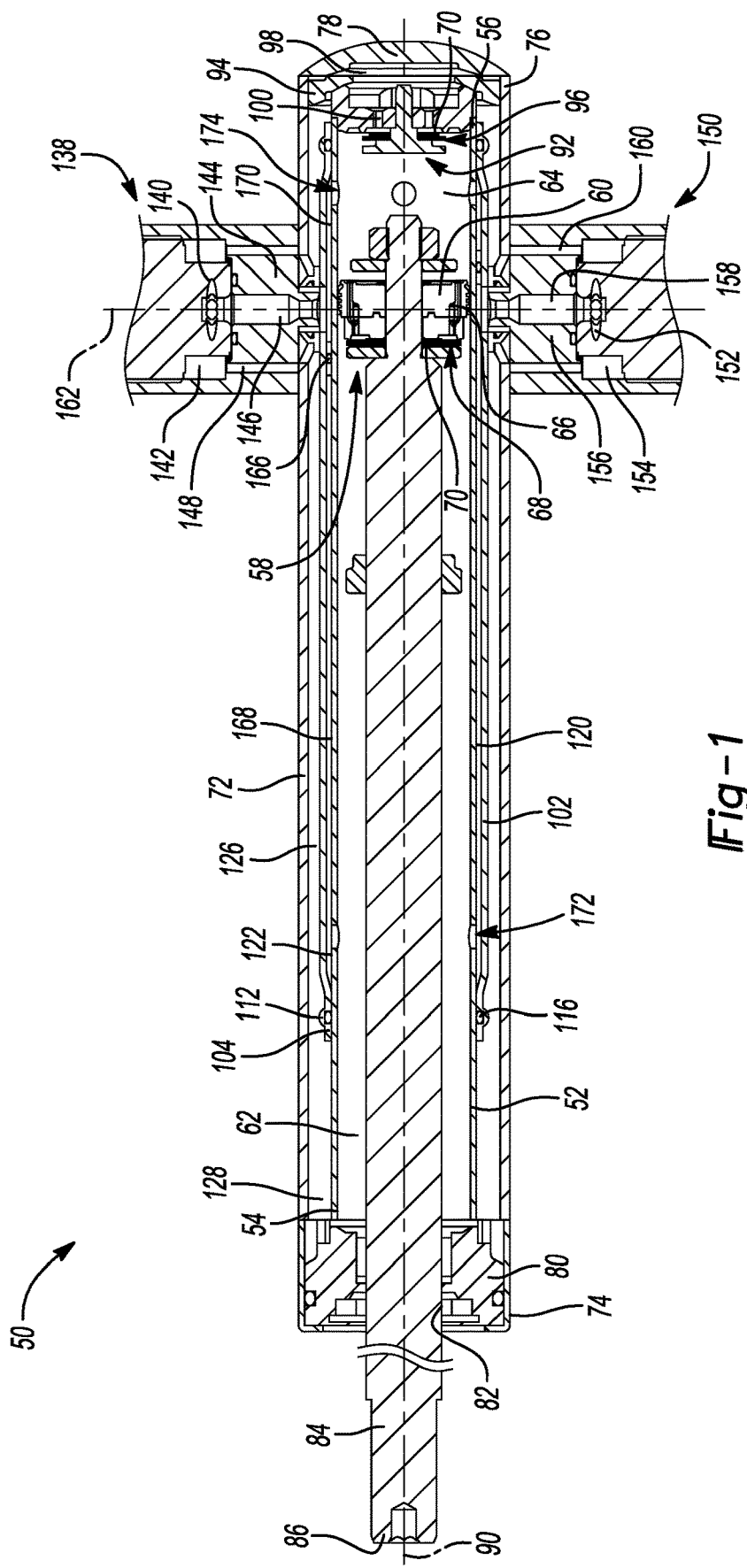
FIG. 1 is a side cross-sectional view of an exemplary damper constructed in accordance with the present disclosure.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
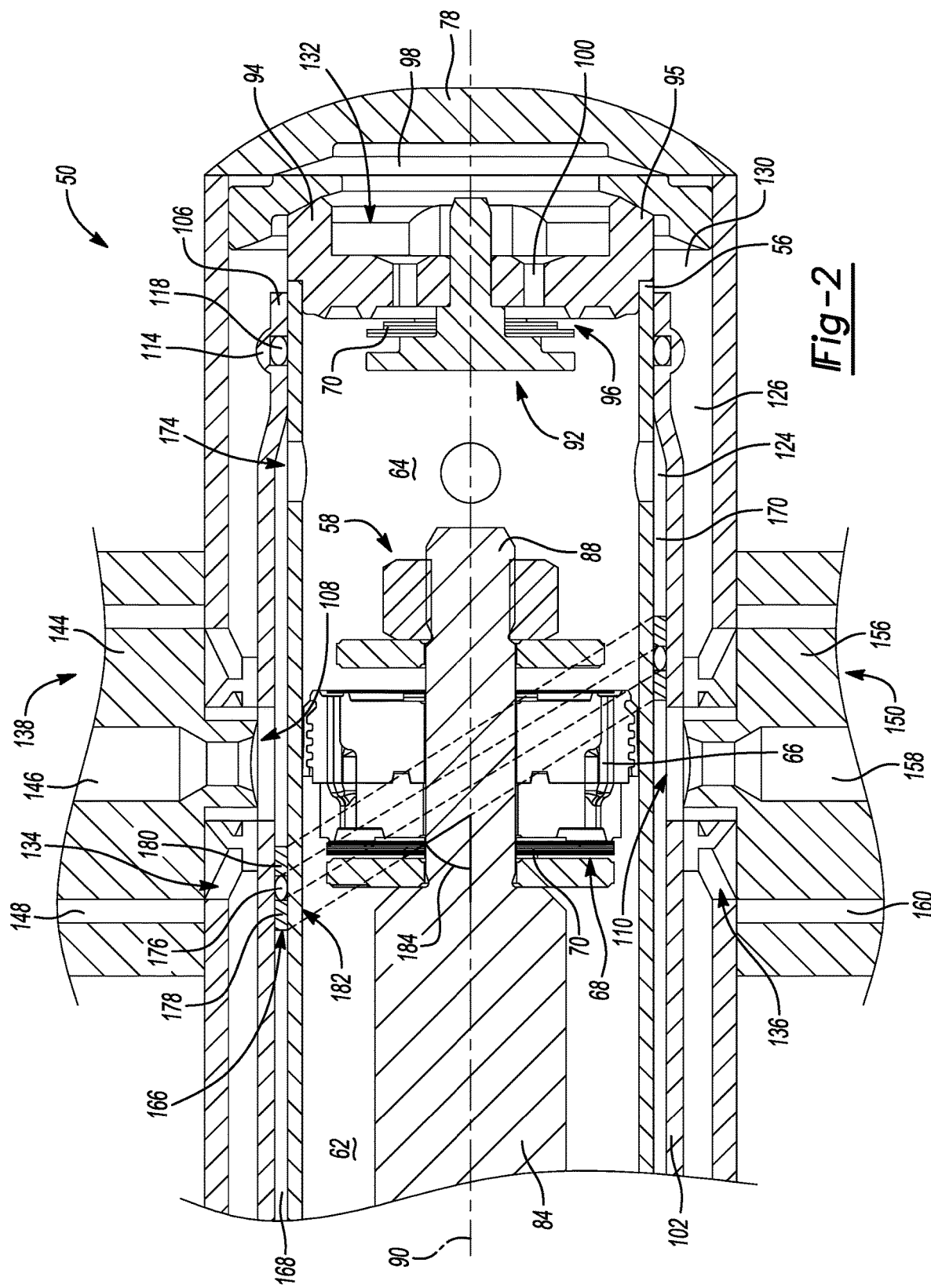
FIG. 2 is an enlarged side cross-sectional view of the exemplary damper shown in FIG. 1.

FIGS. 1 and 2 illustrate an exemplary damper 50 constructed in accordance with the present disclosure. It should be appreciated that the damper 50 is configured to be installed in a vehicle where opposite ends of the damper 50 are connected to a body and a suspension system (i.e., unsprung mass) of the vehicle (not shown). It should also be appreciated that the damper 50 is configured to dampen the relative movement of the unsprung portion of the suspension system and the sprung portion (i.e., body) of the vehicle.

The damping level, damping rate, or damping characteristics of the damper 50 may be controlled to optimize the ride performance of the vehicle. The term "damping level", as used herein, refers to a damping force produced by each damper 50 to counteract compression and/or extension/rebound movements. A higher damping level may correspond to a higher damping force. Similarly, a lower damping level may correspond to a lower damping force. Adjustment of the damping levels is beneficial during braking and turning of the vehicle to counteract brake dive during braking and body roll during turns. Furthermore, the damping level of each damper 50 may be adjusted based on a driving mode of the vehicle. The driving mode may include a sport mode and a comfort mode. In another non-limiting example, the damping level of each damper 50 may be based on external road conditions and/or internal vehicle conditions. External road conditions include rain, snow, mud, and the like. Internal road conditions include fuel level, occupancy of the vehicle, load, and so forth.

The vehicle may be in the form of a variety of vehicle types. Examples of such vehicle types include passenger cars, buses, trucks, off-road vehicles, three-wheelers, ATVs, motor bikes, and so forth. Furthermore, the term "damper" as used herein will refer to dampers in general and will include shock absorbers, McPherson struts, and semi-active and active suspensions.

The damper 50 may optionally by configured as a continuously variable semi-active suspension system damper 50. The damper 50 contains fluid. By way of example and without limitation, the fluid is hydraulic fluid or oil. The damper 50 includes an inner tube 52 extending longitudinally between a first inner tube end 54 and a second inner tube end 56. A piston assembly 58 includes a piston 60 that is slidably disposed within the inner tube 52 to define a first working chamber 62 and a second working chamber 64. The first working chamber 62 is positioned longitudinally between the piston 60 and the first inner tube end 54. The first working chamber 62 acts as a rebound chamber during movement of the piston 60. The second working chamber 64 is positioned longitudinally between the piston 60 and the second inner tube end 56. The second working chamber 64 acts as a compression chamber during movement of the piston 60. The piston 60 includes a piston passage 66 that extends longitudinally through the piston 60 between the first and second working chambers 62, 64.

The piston assembly 58 further includes a piston valve 68. The piston valve 68 is mounted on the piston 60 and configured to limit fluid flow through the piston passage 66 from the second working chamber 64 to the first working chamber 62. The piston valve 68 includes at least one flex disc 70. The flex disc(s) 70 of the piston valve 68 are configured to flex toward the piston 60 and close the piston passage 66 when a pressure differential between the first and second working chambers 62, 64 is below a first pressure threshold. The flex disc(s) 70 of the piston valve 68 are configured to flex away from the piston 60 and open the piston passage 66 when the pressure differential between the first and second working chambers 62, 64 exceeds the first pressure threshold, thereby allowing fluid in the second working chamber 64 to flow through the piston passage 66 and into the first working chamber 62.

The damper 50 also includes an outer tube 72 disposed annularly around the inner tube 52. The outer tube 72 extends longitudinally between a first outer tube end 74 and a second outer tube end 76. A closed end portion 78 is positioned at the second outer tube end 76 and closes off the second outer tube end 76. A piston rod guide 80 is housed inside the first outer tube end 74. The piston rod guide 80 includes a piston rod passage 82 that extends longitudinally between the first outer tube end 74 and the first working chamber 62 of the inner tube 52. A piston rod 84 extends longitudinally between a first piston rod end 86 and a second piston rod end 88 along a longitudinal axis 90, through the piston rod passage 82 of the piston rod guide 80. The second piston rod end 88 is attached to the piston 60 and the first piston rod end 86 is configured to attach to a suspension component of the vehicle (not shown).

The damper 50 further includes a base valve assembly 92. The base valve assembly 92 includes a base valve body 94 and a base valve 96. The base valve body 94 has projections 95 that abut the closed end portion 78 of the second outer tube end 76 and defines a fluid transport chamber 98 positioned between the closed end portion 78 and the base valve body 94. The base valve body 94 includes a base valve passage 100 that extends longitudinally through the base valve body 94 between the second working chamber 64 and the fluid transport chamber 98. The base valve 96 includes at least one flex disc 70 that is configured to flex toward the base valve body 94 and close the base valve passage 100 when a pressure differential between the second working chamber 64 and the fluid transport chamber 98 is below a second pressure threshold. The flex disc(s) 70 of the base valve 96 are configured to flex away from the base valve body 94 and open the base valve passage 100 when the pressure differential between the second working chamber 64 and the fluid transport chamber 98 exceeds the second pressure threshold, thereby allowing fluid in the fluid transport chamber 98 to flow through the base valve passage 100 and into the second working chamber 64.

Further, the damper 50 includes an intermediate tube 102 disposed annularly about the inner tube 52 and positioned radially between the inner tube 52 and outer tube 72. The intermediate tube 102 extends longitudinally between a first intermediate tube end 104 and a second intermediate tube end 106. The intermediate tube 102 includes a first intermediate tube opening 108 and a second intermediate tube opening 110 that extend radially through the intermediate tube 102 at diametrically opposed locations. The first intermediate tube end 104 includes a first circumferential groove 112 and the second intermediate tube end 106 includes a second circumferential groove 114. A first O-ring 116 is positioned within the first circumferential groove 112 and abuts the inner tube 52. A second O-ring 118 is positioned within the second circumferential groove 114 and abuts the inner tube 52. An intermediate channel 120 is disposed radially between the intermediate tube 102 and the inner tube 52. The intermediate channel 120 extends longitudinally between a first intermediate channel end 122 and a second intermediate channel end 124.

The damper 50 further includes a reservoir chamber 126 that is disposed radially between the intermediate tube 102 and the outer tube 72. The reservoir chamber 126 extends longitudinally between a first reservoir chamber end 128 and a second reservoir chamber end 130. The first reservoir chamber end 128 is positioned adjacent to the piston rod guide 80 and the second reservoir chamber end 130 is positioned adjacent to the closed end portion 78 of the second outer tube end 76. At least one reservoir chamber passage 132 is positioned between the projections 95 of the base valve body 94. The reservoir chamber passage 132 is arranged in fluid communication with and extends between the reservoir chamber 126 and the fluid transport chamber 98.

The damper 50 may be positioned at a variety of orientations. By way of non-limiting example, the damper 50 may be positioned horizontally or vertically. When the damper 50 is positioned vertically with the first outer tube end 74 located above the second outer tube end 76, the reservoir chamber 126 is filled with the fluid and a gas. The gas migrates toward the first reservoir chamber end 128 and the fluid fills the reservoir chamber 126 from the second reservoir chamber end 130 toward the first reservoir chamber end 128; however, it should be appreciated that other orientations, including other vertical orientations, are possible.

The damper 50 also includes a first outer tube opening 134 and a second outer tube opening 136 that are arranged in fluid communication with the reservoir chamber 126. The first and second outer tube openings 134, 136 extend radially through the outer tube 72 at diametrically opposed locations. A first control valve 138 is externally mounted to the outer tube 72 and is positioned at the first outer tube opening 134. The first control valve 138 has a first control valve inlet 140 and a first control valve outlet 142. A first control valve seat 144 is positioned in the first outer tube opening 134 and extends radially through the reservoir chamber 126 to abut the intermediate tube 102 and connect with the first intermediate tube opening 108. A first control valve inlet passage 146 extends through the first control valve seat 144. The first control valve inlet passage 146 is aligned with the first intermediate tube opening 108 and is arranged in fluid communication with the first intermediate tube opening 108 and the first control valve inlet 140. A first control valve outlet passage 148 is positioned circumferentially between the first outer tube opening 134 and the first control valve seat 144. The first control valve outlet 142 is arranged in fluid communication with the reservoir chamber 126 via the first control valve outlet passage 148. The first control valve outlet 142 is configured as a plurality of holes, slots, or apertures.

A second control valve 150 is externally mounted to the outer tube 72 and is positioned at the second outer tube opening 136. The second control valve 150 has a second control valve inlet 152 and a second control valve outlet 154.

A second control valve seat 156 is positioned in the second outer tube opening 136 and extends radially through the reservoir chamber 126 to abut the intermediate tube 102 and connect to the second intermediate tube opening 110. A second control valve inlet passage 158 extends through the second control valve seat 156. The second control valve inlet passage 158 is aligned with the second intermediate tube opening 110 and is arranged in fluid communication with the second intermediate tube opening 110 and the second control valve inlet 152. A second control valve outlet passage 160 is positioned circumferentially between the second outer tube opening 136 and the second control valve seat 156. The second control valve outlet 154 is arranged in fluid communication with the reservoir chamber 126 via the second control valve outlet passage 160. The second control valve outlet 154 is configured as a plurality of holes, slots, or apertures.

The first and second control valves 138, 150 are two-position, solenoid actuated electro-mechanical valves. The first and second control valves 138, 150 are positioned at diametrically opposed locations. In other words, the first and second control valves 138, 150 are circumferentially spaced 180 degrees apart from each other about the outer tube 72. Furthermore, the first and second outer tube openings 134, 136 are circumferentially spaced 180 degrees apart from each other about the outer tube 72., the first and second intermediate tube openings 108, 110 are circumferentially spaced 180 degrees apart from each other about the inner tube 52, the first and second control valve inlet passages 146, 158 are circumferentially spaced 180 degrees apart from each other about the intermediate tube 102 and the first and second control valve outlet passages 148, 160 are circumferentially spaced 180 degrees apart from each other about the intermediate tube 102. In other words, the first and second control valves 138, 150, the first and second outer tube openings 134, 136, the first and second control valve inlet passages 146, 158, and the first and second intermediate tube openings 108, 110 are all co-axially aligned with a tangent line 162 that intersects the longitudinal axis 90 as a perpendicular (i.e., 90 degree) angle.

During a compression stroke of the damper 50, the first control valve 138 regulates fluid flow from the second working chamber 64 to the reservoir chamber 126 in response to movement of the piston 60 toward the second inner tube end 56. The first control valve 138 is in the open position during compression strokes of the damper 50 to control compression damping characteristics of the damper 50. Specifically, the degree of opening of the first control valve 138 may be regulated to adjust the compression damping characteristics of the damper 50. The second control valve 150 is in the closed position during compression strokes of the damper 50. As a result, there is no communication of fluid directly between the first working chamber 62 and the reservoir chamber 126.

During an extension/rebound stroke of the damper 50, the second control valve 150 regulates fluid flow from the first working chamber 62 to the reservoir chamber 126 in response to movement of the piston 60 towards the first inner tube end 54. The second control valve 150 is in the open position during extension/rebound strokes of the damper 50 to control extension/rebound damping characteristics of the damper 50. Specifically, the degree of opening of the second control valve 150 may be regulated to adjust the extension/rebound damping characteristics of the damper 50. The first control valve 138 is in the closed position during extension/rebound strokes of the damper 50.

The damper 50 further includes a slanted elliptical seal 166 that is positioned within the intermediate channel 120. The slanted elliptical seal 166 divides the intermediate channel 120 into a first intermediate channel portion 168 and a second intermediate channel portion 170. The first intermediate channel portion 168 is arranged in fluid communication with the first working chamber 62 via at least one first working chamber opening 172. The first working chamber opening 172 extends through the inner tube 52 between the first working chamber 62 and the first intermediate channel portion 168. The first intermediate channel portion 168 is arranged in fluid communication with the second control valve inlet 152 via the second intermediate tube opening 110. The second intermediate channel portion 170 is arranged in fluid communication with the second working chamber 64 via at least one second working chamber opening 174. The second working chamber opening 174 extends through the inner tube 52 between the second working chamber 64 and the second intermediate channel portion 170. The second intermediate channel portion 170 is arranged in fluid communication with the first control valve inlet 140 via the first intermediate tube opening 108.

With continued reference to FIG. 2, the slanted elliptical seal 166 includes an O-ring seal 176. Furthermore, the slanted elliptical seal 166 includes a first support ring 178 and a second support ring 180. Each of the first and second support rings 178, 180 of the slanted elliptical seal 166 is fixedly attached to the intermediate tube 102. More specifically, each of the first and second support rings 178, 180 of the slanted elliptical seal 166 may be welded to the intermediate tube 102. The first and second support rings 178, 180 of the slanted elliptical seal 166 are longitudinally spaced. The O-ring seal 176 is disposed longitudinally between the first and second support rings 178, 180 of the slanted elliptical seal 166 in an abutting arrangement such that the slanted elliptical seal 166 forms a partition 182 between the first intermediate channel portion 168 and the second intermediate channel portion 170. The O-ring seal 176 of the slanted elliptical seal 166 is positioned at an oblique angle 184 relative to the longitudinal axis 90 such that the slanted elliptical seal 166 abuts the intermediate tube 102 between the first intermediate tube opening 108 and the first intermediate tube end 104 and abuts the intermediate tube 102 between the second intermediate tube opening 110 and the second intermediate tube end 106. In other words, the slanted elliptical seal 166 prevents fluid in the first intermediate channel portion 168 from flowing into the first control valve 138 and prevents fluid in the second intermediate channel portion 170 from flowing into the second control valve 150.

Figure 3:
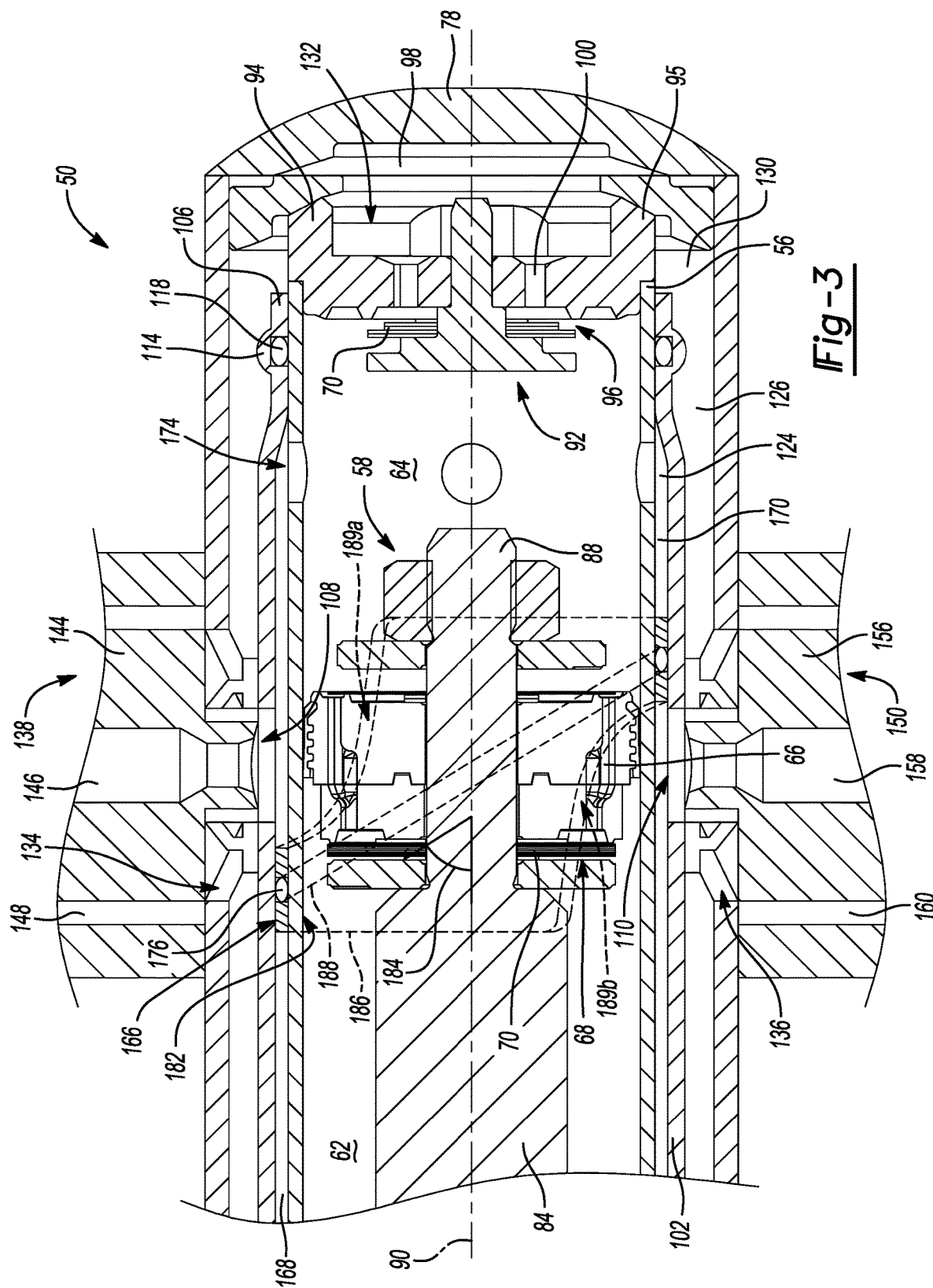
FIG. 3 is an enlarged side cross-sectional view of the exemplary damper shown in FIG. 1, where the O-ring seal carrier has a different arrangement.

In some arrangements and as shown in FIG. 3, the slanted elliptical seal 166 may include a slanted elliptical seal body 186 that extends annularly about the inner tube 52 and includes a slanted elliptical groove 188 that receives the O-ring seal 176. The slanted elliptical seal body 186 generally has a tubular shape and includes two scalloped openings/cut-outs 189a, 189b that are aligned with and are open to the first and second intermediate tube openings 108, 110, respectively, such that the slanted elliptical seal body 186 does not obstruct the first and second intermediate tube openings 108, 110.

Figure 4:
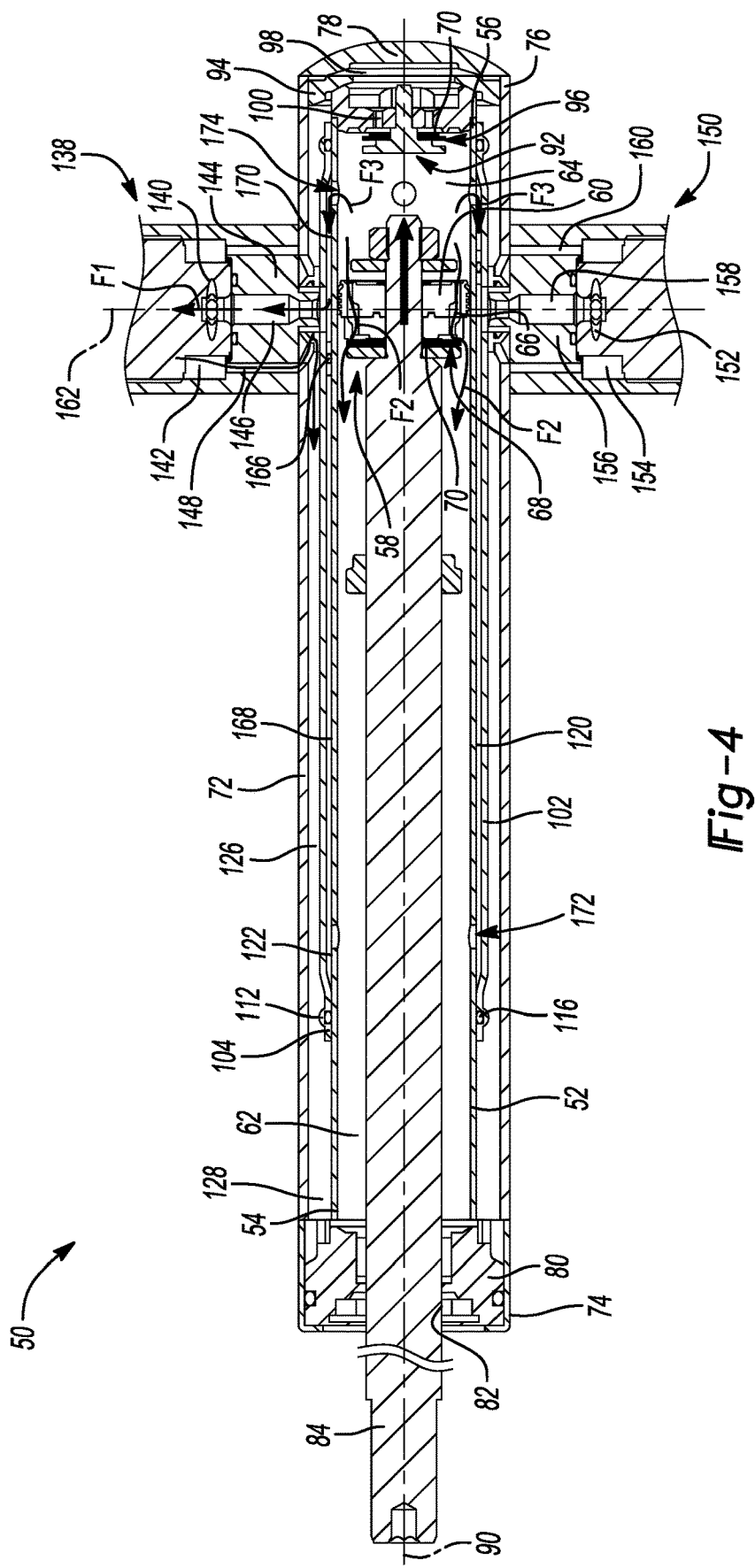
FIG. 4 is a side cross-sectional view of the exemplary damper shown in FIG. 1, where arrows are included illustrating the fluid flow path through the damper during a compression stroke.

Operation of the damper 50 during a compression stroke an extension/rebound stroke will now be explained in greater detail. With reference to FIG. 4, the damper 50 is shown in the compression stroke. A compression flow path F1 is defined when the first control valve 138 is open. The piston 60 moves toward the second inner tube end 56 where fluid in the second working chamber 64 flows through the piston valve 68 of the piston assembly 58 to the first working chamber 62 via the piston passage 66 along flow path F2. Fluid in the second working chamber 64 also flows to the second intermediate channel portion 170 via the second working chamber opening 174 along flow path F3. Fluid in the second intermediate channel portion 170 flows to the first control valve inlet 140 via the first control valve inlet passage 146. Finally, fluid from the first control valve inlet 140 flows to the first control valve outlet 142 and into the reservoir chamber 126 via the first control valve outlet passage 148 along the compression flow path F1.

Figure 5:
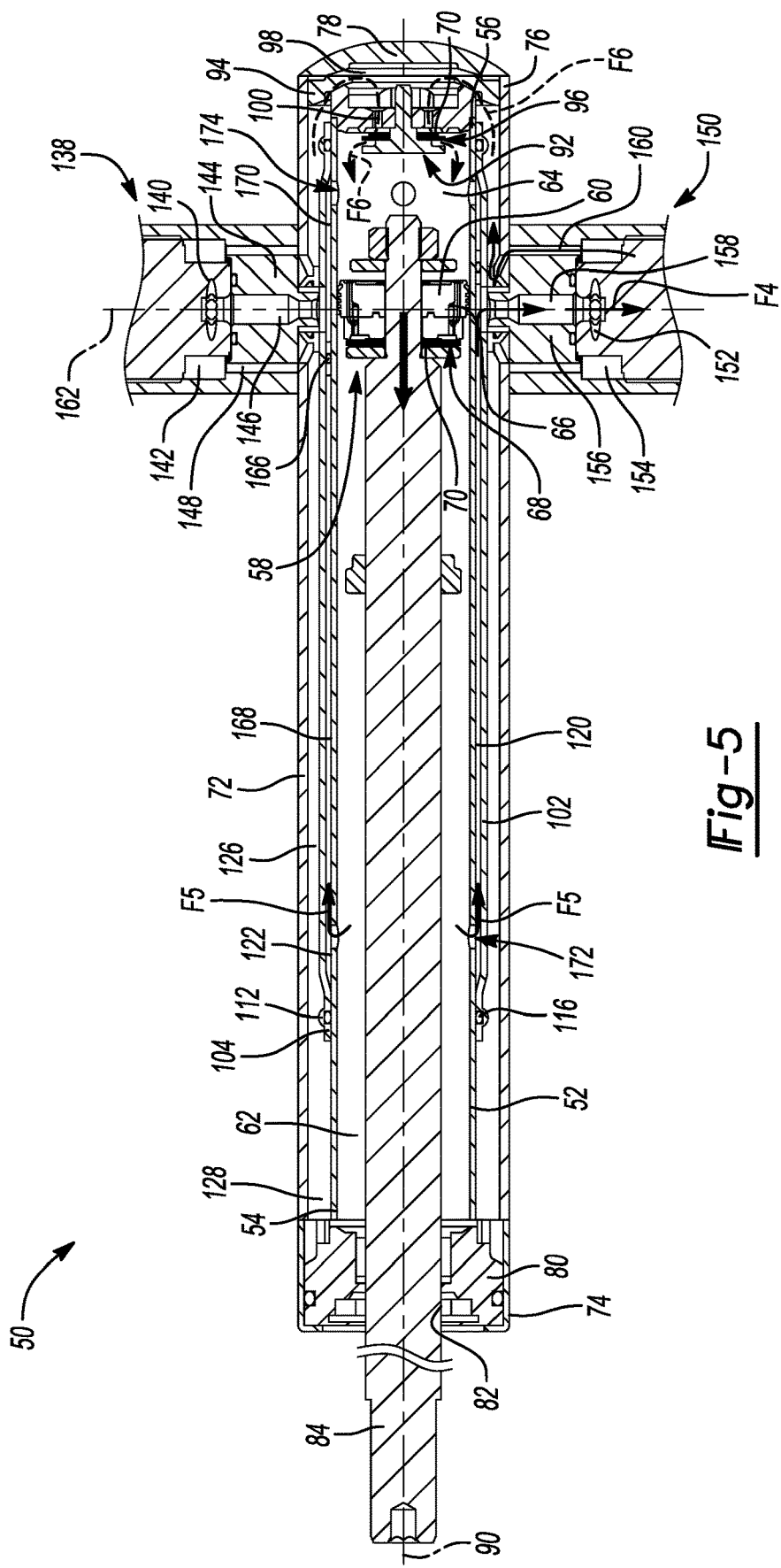
FIG. 5 is a side cross-sectional view of the exemplary damper shown in FIG. 2, where arrows are included illustrating the fluid flow path through the damper during an extension/rebound stroke.

With reference to FIG. 5, the damper 50 is shown in an extension/rebound stroke. An extension flow path F4 is defined when the second control valve 150 is open. The piston 60 moves toward the first inner tube end 54 where fluid in the first working chamber 62 flows to the first intermediate channel portion 168 via the first working chamber opening 172 along flow path F5. Fluid in the reservoir chamber 126 flows through the base valve 96 of the base valve assembly 92 to the second working chamber 64 along flow path F6. Fluid in the first intermediate channel portion 168 flows to the second control valve inlet 152 via the second control valve inlet passage 158. Finally, fluid from the second control valve inlet 152 flows to the second control valve outlet 154 and into the reservoir chamber 126 via the second control valve outlet passage 160 along the extension flow path F4.

In FIGS. 6 to 10, another exemplary damper 250 is shown. Many of the elements of the damper 50 previously described are the same or substantially the same amongst the embodiments and will not be described in detail again. Equivalent elements shared between the embodiments have the same or corresponding reference numbers. For example, reference numeral 50 in FIGS. 1 to 5 corresponds to reference numeral 250 in FIGS. 6 to 10. Additionally, reference numeral 150 in FIGS. 1 to 5 correspond to reference numeral 350 in FIGS. 6 to 10.

Figure 6:
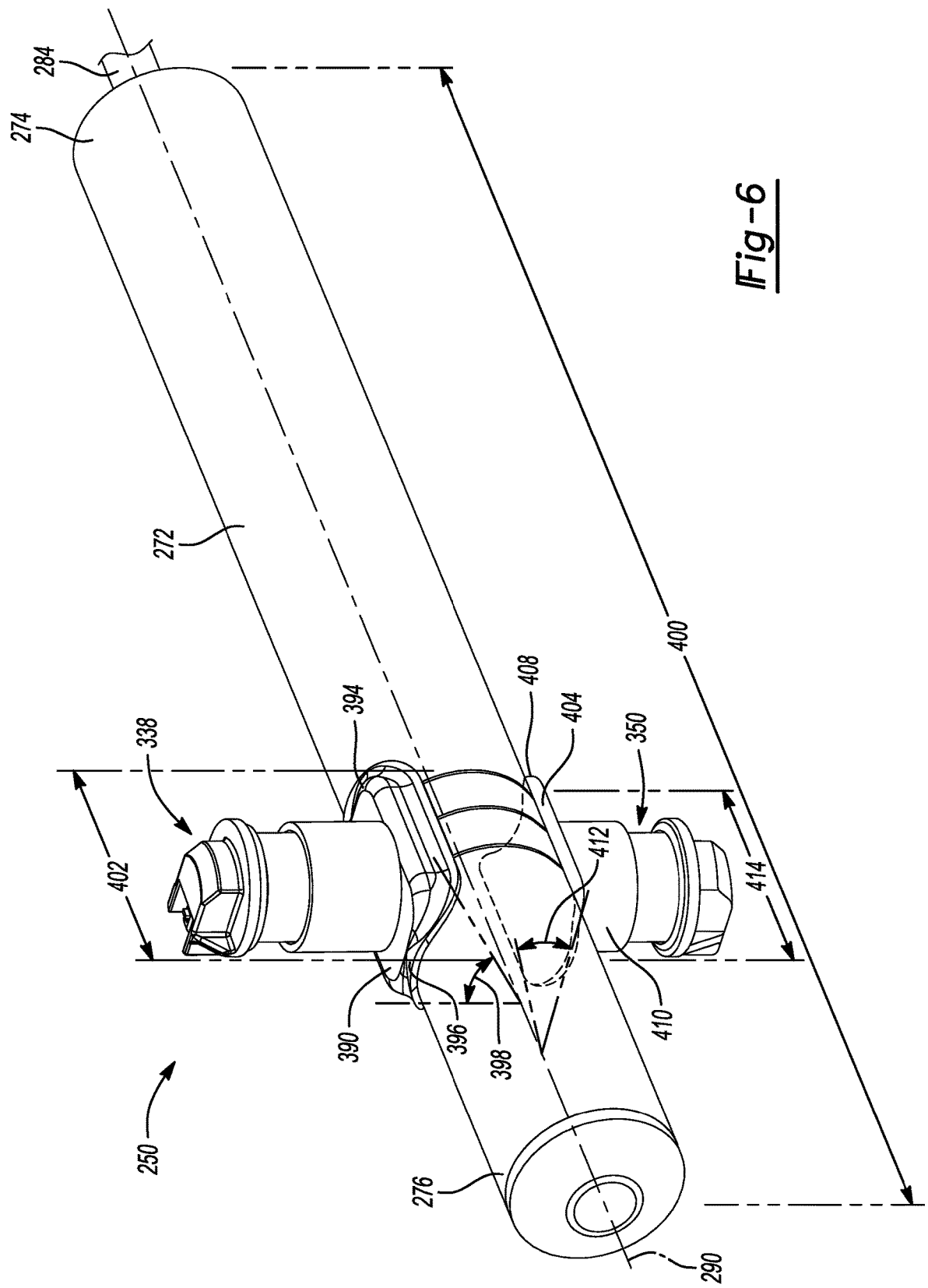
FIG. 6 is a perspective view of another exemplary damper constructed in accordance with the present disclosure.
Figure 7:
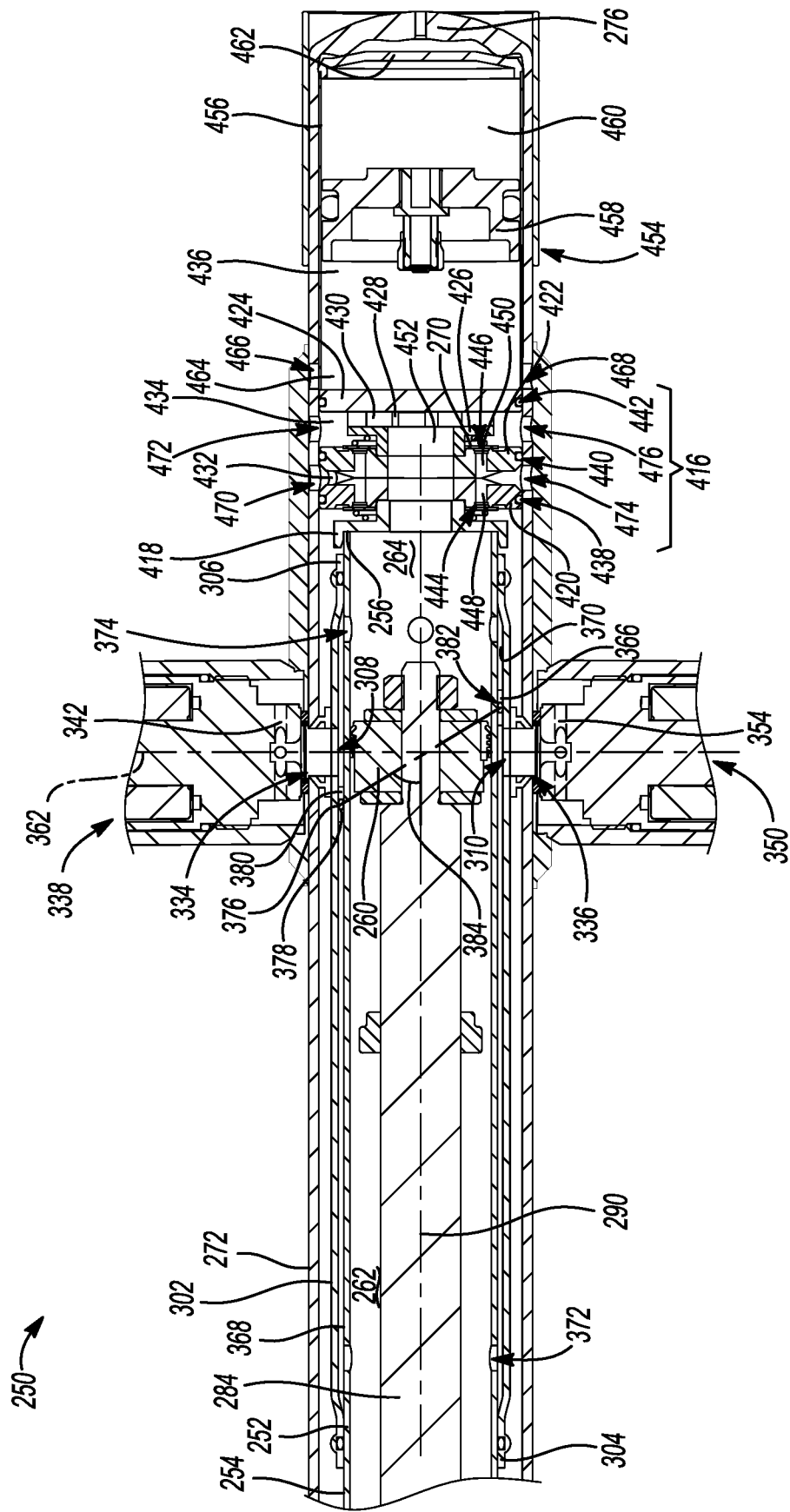
FIG. 7 is an enlarged side cross-sectional view of the exemplary damper shown in FIG. 6.
Figure 8:
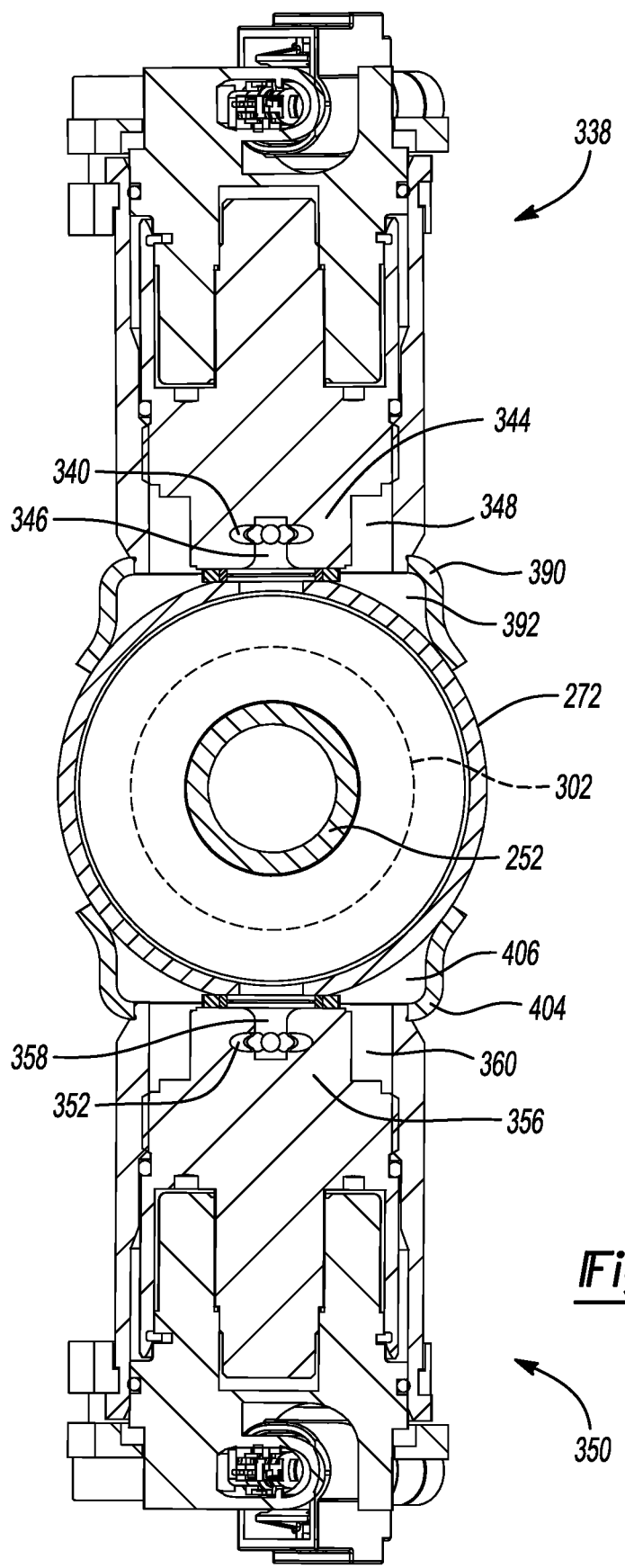
FIG. 8 is a rear cross-sectional view of the exemplary damper shown in FIG. 6.

FIGS. 6 to 8 illustrate another exemplary damper 250. The damper 250 includes an inner tube 252 that extends longitudinally between a first inner tube end 254 and a second inner tube end 256. A piston 260 is slidably disposed within the inner tube 252 to define a first working chamber 262 and a second working chamber 264 within the inner tube 252. A piston rod 284 extends longitudinally along a longitudinal axis 290 and is connected to the piston 260 at one end.

In the illustrated example, the piston 260 seals against the inside of the inner tube 252 and is free of orifices or passages such that there is no fluid flow through the piston 260. In other words, fluid in the first working chamber 262 cannot pass through the piston 260 into the second working chamber 264 or vice versa. However, alternative configurations are possible where the piston 260 may include valving to limit high internal pressures within the first and second working chambers 262, 264.

The damper 250 further includes an outer tube 272 disposed annularly around the inner tube 252. The outer tube 272 extends longitudinally between a first outer tube end 274 and a second outer tube end 276. The outer tube 272 includes first and second outer tube openings 334, 336 that extend radially through the outer tube 272 at diametrically opposed locations. An intermediate tube 302 is disposed annularly about the inner tube 252 and is positioned radially between the inner tube 252 and the outer tube 272. The intermediate tube 302 extends longitudinally between a first intermediate tube end 304 and a second intermediate tube end 306. The intermediate tube 302 includes a first intermediate tube opening 308 and a second intermediate tube opening 310, which extend radially through the intermediate tube 302 at diametrically opposed locations. An intermediate channel 320 is disposed radially between the intermediate tube 302 and the inner tube 252 and a reservoir chamber 326 is disposed radially between the intermediate tube 302 and the outer tube 272.

As shown in FIG. 7, the damper 250 further includes a slanted elliptical seal 366 that is positioned within the intermediate channel 320. The slanted elliptical seal 366 divides the intermediate channel 320 into a first intermediate channel portion 368 and a second intermediate channel portion 370. The first intermediate channel portion 368 is arranged in fluid communication with the first working chamber 262 via at least one first working chamber opening 372. The first working chamber opening 372 extends through the inner tube 252 between the first working chamber 262 and the first intermediate channel portion 368. The second intermediate channel portion 370 is arranged in fluid communication with the second working chamber 264 via at least one second working chamber opening 374. The second working chamber opening 374 extends through the inner tube 252 between the second working chamber 264 and the second intermediate channel portion 370.

The slanted elliptical seal 366 includes an O-ring seal 376. Furthermore, the slanted elliptical seal 366 includes a first support ring 378 and a second support ring 380. Each of the first and second support rings 378, 380 of the slanted elliptical seal 366 is fixedly attached to the intermediate tube 302. More specifically, each of the first and second support rings 378, 380 of the slanted elliptical seal 366 may be welded to the intermediate tube 302. The first and second support rings 378, 380 of the slanted elliptical seal 366 are longitudinally spaced and the O-ring seal 376 is disposed longitudinally between the first and second support rings 378, 380 of the slanted elliptical seal 366 in an abutting arrangement. Thus, the slanted elliptical seal 366 forms a partition 382 between the first intermediate channel portion 368 and the second intermediate channel portion 370. The O-ring seal 376 of the slanted elliptical seal 366 is positioned at an oblique angle 384 relative to the longitudinal axis 290 such that the slanted elliptical seal 366 abuts the intermediate tube 302 between the first intermediate tube opening 308 and the first intermediate tube end 304 and abuts the intermediate tube 302 between the second intermediate tube opening 310 and the second intermediate tube end 306.

In some arrangements, the slanted elliptical seal 366 may include a slanted elliptical seal body (shown in FIG. 3) that extends annularly about the inner tube 252 and includes a slanted elliptical groove (shown in FIG. 3) that receives the O-ring seal 376.

With continued reference to FIGS. 6 and 8, the damper 250 also includes a first cover member 390. The first cover member 390 is attached to the outer tube 272. By way of example and without limitation, the first cover member 390 may be welded to the outer tube 272. A first collector chamber 392 is defined between the first cover member 390 and the outer tube 272. The first collector chamber 392 is positioned externally to (i.e., radially outward of) the outer tube 272. The first collector chamber 392 extends longitudinally between a first collector chamber end 394 and a second collector chamber end 396. The first collector chamber 392 has a limited circumferential extent and extends about the outer tube 272 in a first arc 398 that is less than or equal to 180 degrees. The outer tube 272 has an outer tube length 400 that is measured longitudinally between the first and second outer tube ends 274, 276. The first collector chamber 392 has a first collector chamber length 402 that is measured longitudinally between the first and second collector chamber ends 394, 396. The first collector chamber length 402 is shorter than the outer tube length 400. In other words, the first collector chamber 392 is shorter than the outer tube 272 and does not run the entire length of the outer tube 272.

A first control valve 338 is externally mounted to the first cover member 390. The first control valve 338 has a first control valve inlet 340 and a first control valve outlet 342. A first control valve seat 344 is positioned at the first outer tube opening 334 and extends radially through the reservoir chamber 326 to abut the intermediate tube 302 and connect with the first intermediate tube opening 308. A first control valve inlet passage 346 extends through the first control valve seat 344. The first control valve inlet passage 346 is aligned with the first intermediate tube opening 308 and is arranged in fluid communication with the first intermediate tube opening 308 and the first control valve inlet 340. In other words, the first control valve inlet 340 is arranged in fluid communication with the second intermediate channel portion 370 via the first control valve inlet passage 346. A first control valve outlet passage 348 is positioned circumferentially between the first outer tube opening 334 and the first control valve seat 344. The first control valve outlet 342 is arranged in fluid communication with the first collector chamber 392 via the first control valve outlet passage 348.

The damper 250 further includes a second cover member 404. The second cover member 404 is attached to the outer tube 272 at a position that is diametrically opposed to the first cover member 390. By way of example and without limitation, the second cover member 404 may be welded to the outer tube 272. A second collector chamber 406 is defined between the second cover member 404 and the outer tube 272. The second collector chamber 406 is positioned external to (i.e., radially outward of) the outer tube 272. The second collector chamber 406 extends longitudinally between a third collector chamber end 408 and a fourth collector chamber end 410. The second collector chamber 406 has a limited circumferential extent and extends about the outer tube 272 in a second arc 412 that is less than or equal to 180 degrees. The second collector chamber 406 has a second collector chamber length 414 that is measured longitudinally between the third and fourth collector chamber ends 408, 410. The second collector chamber length 414 is shorter than the outer tube length 400. Preferably, the first collector chamber length 402 is equal to the second collector chamber length 414.

A second control valve 350 is externally mounted to the second cover member 404. The second control valve 350 has a second control valve inlet 352 and a second control valve outlet 354. A second control valve seat 356 is positioned in the second outer tube opening 336 and extends radially through the reservoir chamber 326 to abut the second intermediate tube and connect to the second intermediate tube opening 310. A second control valve inlet passage 358 extends through the second control valve seat 356. The second control valve inlet passage 358 is aligned with the second intermediate tube opening 310 and arranged in fluid communication with the second intermediate tube opening 310 and the second control valve inlet 352. In other words, the second control valve inlet 352 is arranged in fluid communication with the first intermediate channel portion 368 via the second control valve inlet passage 358. A second control valve outlet passage 360 is positioned circumferentially between the second outer tube opening 336 and the second control valve seat 356. The second control valve outlet 354 is arranged in fluid communication with the second collector chamber 406 via the second control valve outlet passage 360.

Because the slanted elliptical seal 366 is positioned at an oblique angle 384 relative to the longitudinal axis 290 and prevents fluid in the first intermediate channel portion 368 from flowing into the first control valve 338 and prevents fluid in the second intermediate channel portion 370 from flowing into the second control valve 350, the first and second control valves 338, 350 may be positioned at diametrically opposed locations. More specifically, the first and second control valves 338, 350 are circumferentially spaced 180 degrees apart from each other about the outer tube 272, the first and second intermediate tube openings 308, 310 are circumferentially spaced 180 degrees apart from each other about the inner tube 252, the first and second control valve inlet passages 346, 358 are circumferentially spaced 180 degrees apart from each other about the intermediate tube 302, and the first and second control valve outlet passages 348, 360 are circumferentially spaced 180 degrees apart from each other about the intermediate tube 302. In other words, the first and second control valves 338, 350, the first and second control valve inlet passages 346, 358, and the first and second intermediate tube opening 308, 310 are all co-axially aligned with a tangent line 362 that intersects the longitudinal axis 290 as a perpendicular angle.

As shown in FIG. 7, the damper 250 includes an intake valve assembly 416 that is disposed inside the outer tube 272. The intake valve assembly 416 includes an adapter ring 418, a first intake valve body 420 that abuts the adapter ring 418, a second intake valve body 422 that abuts the first intake valve body 420, a divider body 424, and a toothed ring 426. The adapter ring 418 is press-fit into the second inner tube end 256. The toothed ring 426 is positioned longitudinally between the second intake valve body 422 and the divider body 424 in an abutting arrangement. The toothed ring 426 includes a plurality of teeth 428 that are arranged to abut the divider body 424 and the plurality of teeth 428 are circumferentially spaced to define a plurality of channels 430 in the toothed ring 426.

The first and second intake valve bodies 420, 422 abut the outer tube 272 to define a first intermediate chamber 432. The first intermediate chamber 432 is positioned longitudinally between the first and second intake valve bodies 420, 422. The divider body 424 abuts the outer tube 272 such that a second intermediate chamber 434 is defined longitudinally between the divider body 424 and the second intake valve body 422. An accumulation chamber 436 is positioned longitudinally between the divider body 424 and the second outer tube end 276. Thus, the first intake valve body 420 forms a first partition 438 between the first intermediate chamber 432 and the reservoir chamber 326, the second intake valve body 422 forms a second partition 440 between the first and second intermediate chambers 432, 434, and the divider body 424 forms a third partition 442 between the second intermediate chamber 434 and the accumulation chamber 436.

The intake valve assembly 416 includes a first intake valve 444 that is mounted to the first intake valve body 420 and a second intake valve 446 that is mounted to the second intake valve body 422. The first intake valve 444 controls fluid flow through the intake valve assembly 416 between the first intermediate chamber 432 and the reservoir chamber 326. The first intake valve 444 includes at least one flex disc 270 and the first intake valve body 420 includes a first intake valve passage 448. The flex disc 270 of the first intake valve 444 is configured to flex toward the first intake valve body 420 and close the first intake valve passage 448 when a pressure differential between the first intermediate chamber 432 and the reservoir chamber 326 is below a third pressure threshold. The flex disc 270 of the first intake valve 444 is configured to flex away from the first intake valve body 420 and open the first intake valve passage 448 when the pressure differential between the first intermediate chamber 432 and the reservoir chamber 326 exceeds the third pressure threshold, thereby allowing fluid in the first intermediate chamber 432 to flow through the first intake valve passage 448 and into the reservoir chamber 326.

The second intake valve 446 controls fluid flow through the intake valve assembly 416 between the first intermediate chamber 432 and the second intermediate chamber 434. The second intake valve 446 includes at least one flex disc 270 and the second intake valve body 422 includes a second intake valve passage 450. The flex disc 270 of the second intake valve 446 is configured to flex toward the second intake valve body 422 and close the second intake valve passage 450 when a pressure differential between the first intermediate chamber 432 and the second intermediate chamber 434 is below a fourth pressure threshold. The flex disc 270 of the second intake valve 446 is configured to flex away from the second intake valve body 422 and open the second intake valve passage 450 when the pressure differential between the first intermediate chamber 432 and the second intermediate chamber 434 exceeds the fourth pressure threshold, thereby allowing fluid in the first intermediate chamber 432 to flow through the second intake valve passage 450 and into the second intermediate chamber 434.

The intake valve assembly 416 also includes a central passage 452 that extends longitudinally through the adapter ring 418, the first and second intake valve bodies 420, 422, and the toothed ring 426. The central passage 452 is arranged in fluid communication with the second working chamber 264 and the second intermediate chamber 434. Specifically, the plurality of channels 430 between the plurality of teeth 428 of the toothed ring 426 permit fluid flow between the second intermediate chamber 434 and the central passage 452.

In accordance with the illustrated embodiment, the damper 250 includes an accumulator insert 454 that is disposed within the second outer tube end 276. The accumulator insert 454 includes an accumulator sleeve 456, a floating piston 458, and a pressurized chamber 460. The accumulator sleeve 456 is positioned inside the outer tube 272 and extends between a closed end 462 and an open end 464. The closed end 462 is positioned adjacent to the second outer tube end 276. The open end 464 is positioned adjacent to the intake valve assembly 416 such that the open end 464 abuts the divider body 424. The intake valve assembly 416 is clamped between the open end 464 of the accumulator sleeve 456 and the second inner tube end 256. In accordance with this arrangement, the first and second intake valve bodies 420, 422 and the divider body 424 do not need to be mechanically attached to the outer tube 272 because the intake valve assembly 416 is held in place by the accumulator sleeve 456.

The floating piston 458 is pre-assembled inside the accumulator sleeve 456 in a sliding fit. The accumulation chamber 436 is positioned longitudinally between the intake valve assembly 416 and the floating piston 458 and the pressurized chamber 460 is positioned longitudinally between the floating piston 458 and the closed end 462 of the accumulator sleeve 456. In other words, the pressurized chamber 460 is separated from the accumulation chamber 436 by the floating piston 458. The pressurized chamber 460 contains pressurized fluid that operates to bias the floating piston 458 toward the intake valve assembly 416.

The damper 250 includes one or more first accumulator ports 466 and one or more second accumulator ports 468 in the outer tube 272. Specifically, the first accumulator ports 466 are arranged in fluid communication with and extend between the first collector chamber 392 and the accumulation chamber 436. The second accumulator ports 468 are arranged in fluid communication with and extend between the second collector chamber 406 and the accumulation chamber 436. In other words, the accumulation chamber 436 is arranged in fluid communication with the first collector chamber 392 via the first accumulator port 466 and arranged in fluid communication with the second collector chamber 406 via the second accumulator port 468.

The damper 250 further includes at least one first, second, third and fourth open ports 470, 472, 474, 476 in the outer tube 272. The first open ports 470 are arranged in fluid communication with and extend between the first collector chamber 392 and the first intermediate chamber 432. The second open ports 472 are arranged in fluid communication with and extend between the first collector chamber 392 and the second intermediate chamber 434. The third open ports 474 are arranged in fluid communication with and extend between the second collector chamber 406 and the first intermediate chamber 432. The fourth open ports 476 are arranged in fluid communication with and extend between the second collector chamber 406 and the second intermediate chamber 434. Each of the first accumulator port 466, the second accumulator port 468, the first open port 470, the second open port 472, the third open port 474, and the fourth open port 476 are in the form of open holes, slots, or apertures that are not open or closed by a valve. As such, fluid may freely flow between the first collector chamber 392 and the accumulation chamber 436, first intermediate chamber 432, and the second intermediate chamber 434. Additionally, fluid may freely flow between the second collector chamber 406 and the accumulation chamber 436, the first intermediate chamber 432, and the second intermediate chamber 434.

Figure 9:
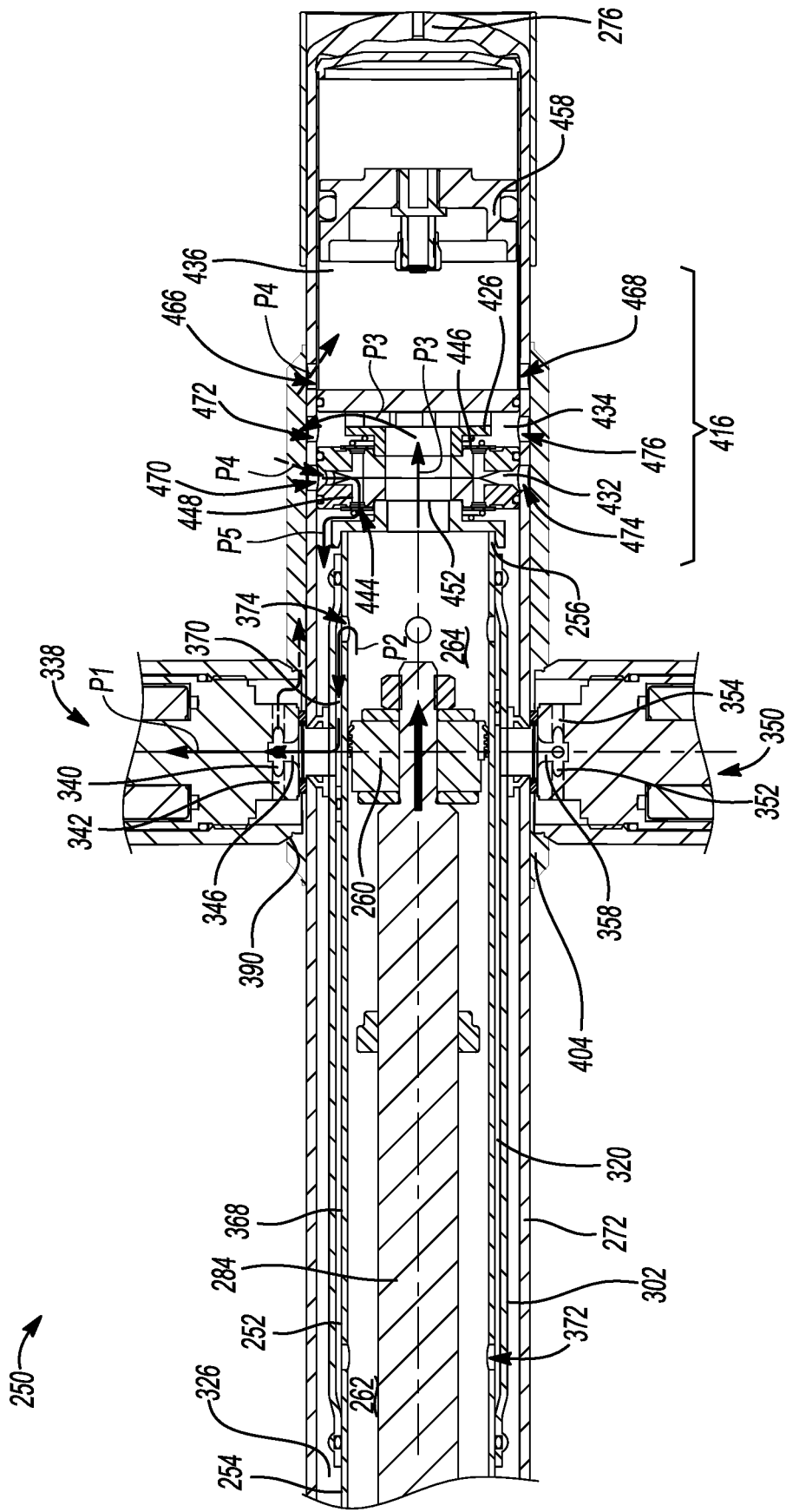
FIG. 9 is an enlarged side cross-sectional view of the exemplary damper shown in FIG. 6, where arrows are included illustrating the fluid flow path through the damper during a compression stroke.

Operation of the damper 250 during a compression stroke and an extension/rebound stroke will now be explained in greater detail. As shown in FIG. 9, when the piston 260 moves towards the intake valve assembly 416 during a compression stroke, the volume of the second working chamber 264 decreases. The first control valve 338 is actuated to the open position during compression strokes of the damper 250 to regulate fluid flow from the second intermediate chamber 434 to the first collector chamber 392. Specifically, the degree of opening of the first control valve 338 may be regulated to adjust the compression damping characteristics of the damper 250. At the same time, the second control valve 350 is in the closed position during compression strokes of the damper 250.

During a compression stroke, a compression flow path P1 is defined when the first control valve 338 is open. The piston 260 moves toward the second inner tube end 256 where fluid in the second working chamber 264 flows to the second intermediate channel portion 370 via the second working chamber opening 374 in the inner tube 252 along flow path P2. Fluid in the second intermediate channel portion 370 flows into the first control valve inlet 340 via the first control valve inlet passage 346 and out into the first collector chamber 392 via the first control valve outlet 342 along compression flow path P1. Fluid flows from the second working chamber 264 through the central passage 452 into the second intermediate chamber 434 via the toothed ring 426 and fluid in the second intermediate chamber 434 flows into the first collector chamber 392 via the second open port 472 along flow path P3. Fluid in the first collector chamber 392 flows into the accumulation chamber 436 via the first accumulator port 466 and into the first intermediate chamber 432 via the first open port 470 along flow path P4. When the pressure differential between the first intermediate chamber 432 and the reservoir chamber 326 exceeds the third pressure threshold, the first intake valve 444 will open and will flow through the first intake valve passage 448 and into the reservoir chamber 326 along flow path P5.

As a greater length of the piston rod 284 moves into the first working chamber 262 in a compression stroke, volume of the fluid that is displaced by the piston rod 284 increases. Fluid flows into the first collector chamber 392, through the first accumulator port 466, and into the accumulation chamber 436, which causes the floating piston 458 to move away from the intake valve assembly 416, increasing a size of the accumulation chamber 436.

Figure 10:
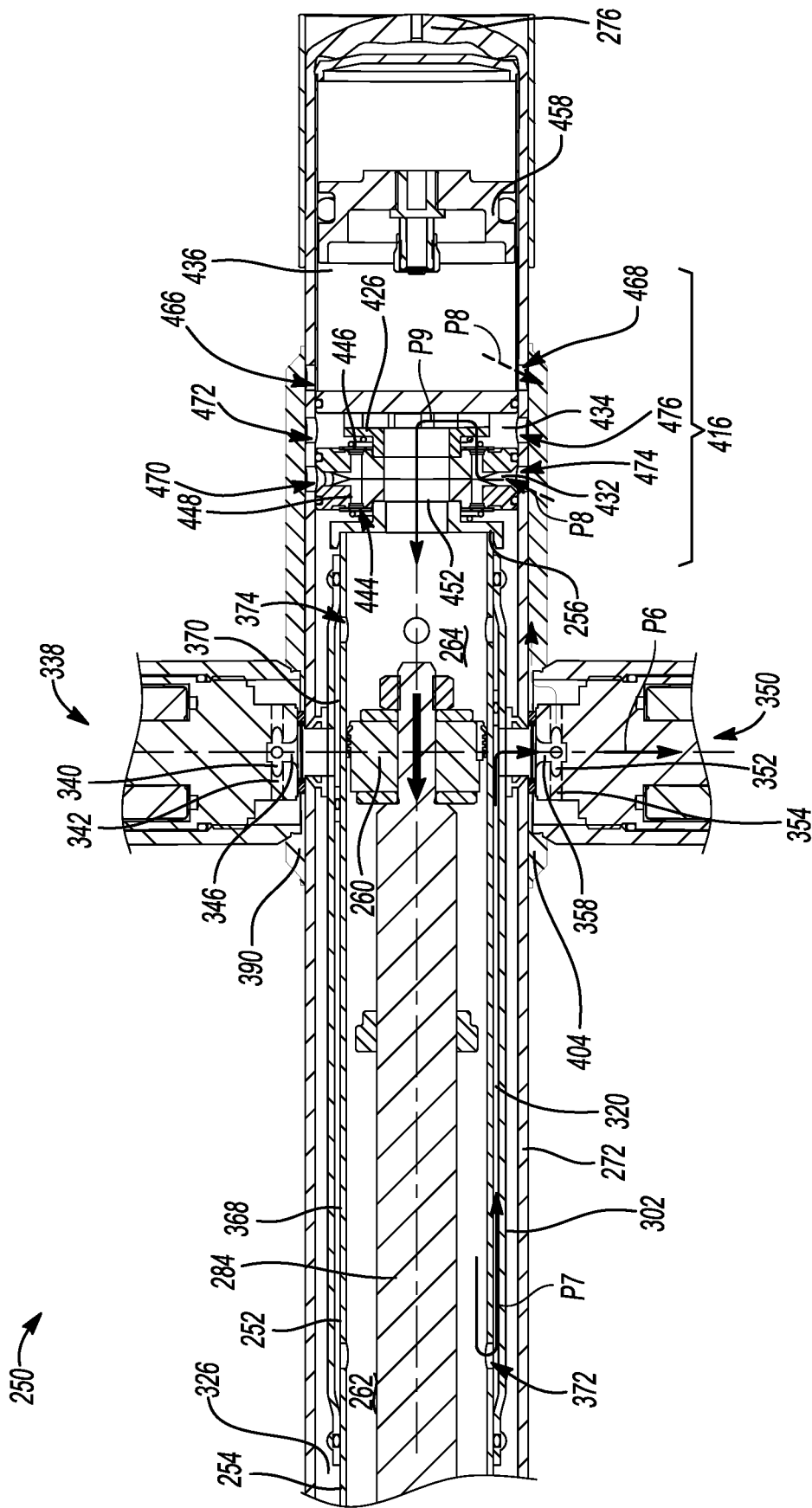
FIG. 10 is an enlarged side cross-sectional view of the exemplary damper shown in FIG. 6, where arrows are included illustrating the fluid flow path through the damper during an extension/rebound stroke.

As shown in FIG. 10, when the piston 260 moves away from the intake valve assembly 416 and towards the first inner tube end 254 during an extension/rebound stroke, the volume of the fluid in the second working chamber 264 increases. The second control valve 350 is actuated to the open position during extension/rebound strokes of the damper 250 to regulate fluid flow from the first intermediate channel portion 368 to the second collector chamber 406. Specifically, the degree of opening of the second control valve 350 may be regulated to adjust the extension/rebound damping characteristics of the damper 250. At the same time, the first control valve 338 is in the closed position during extension/rebound strokes of the damper 250.

During an extension/rebound stroke, an extension flow path P6 is defined when the second control valve 350 is open. The piston 260 moves toward the first inner tube end 254 where fluid in the first working chamber 262 flows to the first intermediate channel portion 368 via the first working chamber opening 372 along flow path P7. Fluid in the first intermediate channel portion 368 flows into the second control valve inlet 352 via the second control valve inlet passage 358 and out into the second collector chamber 406 via the second control valve outlet 354 along extension flow path P6. Fluid in the accumulation chamber 436 flows into the second collector chamber 406 via the second accumulation port along flow path P8. Fluid in the second collector chamber 406 flows to the first intermediate chamber 432 via the third open port 474. When the pressure differential between the first intermediate chamber 432 and the second intermediate chamber 434 exceeds the break pressure of the second intake valve 446, the second intake valve 446 will open and fluid in the first intermediate chamber 432 will flows to the second intermediate chamber 434 along flow path P9. Fluid in the second intermediate chamber 434 flows to the central passage 452 through the toothed ring 426 and fluid in the central passage 452 flows to the second working chamber 264.

As the piston rod 284 moves out of the first working chamber 262 in an extension/rebound stroke, volume that is displaced by the piston rod 284 decreases. Thus, an additional flow of fluid must be supplied from the accumulation chamber 436 to compensate for the decrease in the displaced volume. Fluid in the accumulation chamber 436 flows through the second accumulator port 468 and into the second collector chamber 406, which causes the floating piston 458 to move towards the intake valve assembly 416, decreasing the size of the accumulation chamber 436.

While aspects of the present disclosure have been particularly shown and described with reference to the embodiments above, it will be understood by those skilled in the art that various additional embodiments may be contemplated by the modification of the disclosed dampers 50, 250 without departing from the spirit and scope of what is disclosed. Such embodiments should be understood to fall within the scope of the present disclosure as determined based upon the claims and any equivalents thereof.

What is claimed is:
1. A damper, comprising:
an inner tube extending longitudinally between a first inner tube end and a second inner tube end along a longitudinal axis;
a piston assembly including a piston slidably disposed within said inner tube to define a first working chamber and a second working chamber;
an outer tube disposed annularly around said inner tube and extends longitudinally between a first outer tube end and a second outer tube end;
an intermediate tube disposed annularly about said inner tube and positioned radially between said inner tube and said outer tube;
said intermediate tube extends longitudinally between a first intermediate tube end and a second intermediate tube end;
said intermediate tube includes a first intermediate tube opening and a second intermediate tube opening that extend radially through said intermediate tube;
an intermediate channel disposed radially between said intermediate tube and said inner tube;
a reservoir chamber disposed radially between said intermediate tube and said outer tube;
a slanted elliptical seal that is positioned inside said intermediate channel and divides said intermediate channel into a first intermediate channel portion and a second intermediate channel portion;
a first control valve arranged in fluid communication with said second intermediate channel portion via said first intermediate tube opening;
a second control valve arranged in fluid communication with said first intermediate channel portion via said second intermediate tube opening; and
said slanted elliptical seal is positioned at an oblique angle relative to said longitudinal axis such that said slanted elliptical seal abuts said intermediate tube between said first intermediate tube opening and said first intermediate tube end and abuts said intermediate tube between said second intermediate tube opening and said second intermediate tube end.

2. The damper of claim 1, wherein said first and second control valves are externally mounted to said outer tube.

3. The damper of claim 2, wherein said first and second control valves are positioned at diametrically opposed locations such that said first and second control valves are circumferentially spaced about said outer tube 180 degrees apart from each other.

4. The damper of claim 3, wherein said first and second intermediate tube openings are positioned at diametrically opposed locations such that said first and second intermediate tube openings are circumferentially spaced about said intermediate tube 180 degrees apart from each other.

5. The damper of claim 4, wherein said first and second intermediate tube openings and said first and second control valves are co-axially aligned with a tangent line that intersects said longitudinal axis at a perpendicular angle.

6. The damper of claim 1, wherein said slanted elliptical seal includes an O-ring seal that forms a partition between said first intermediate channel portion and said second intermediate channel portion such that said slanted elliptical seal prevents fluid in said first intermediate channel portion from flowing into said first control valve and said slanted elliptical seal prevents fluid in said second intermediate channel portion from flowing into said second control valve.

7. The damper of claim 6, wherein said slanted elliptical seal includes a first support ring and a second support ring such that said O-ring seal is disposed longitudinally between said first and second support rings in an abutting arrangement.

8. The damper of claim 7, wherein each of said first and second support rings of said slanted elliptical seal is fixedly attached to said intermediate tube.

9. The damper of claim 7, wherein said slanted elliptical seal includes a slanted elliptical seal body that extends annularly about said inner tube and includes a slanted elliptical groove that receives said O-ring seal.

10. A damper, comprising:
an inner tube extending longitudinally between a first inner tube end and a second inner tube end along a longitudinal axis;
a piston assembly including a piston and a piston valve, said piston slidably disposed within said inner tube to define a first working chamber and a second working chamber;
an outer tube disposed annularly around said inner tube and extends longitudinally between a first outer tube end and a second outer tube end;
an intermediate tube disposed annularly about said inner tube and positioned radially between said inner tube and said outer tube;
said intermediate tube extends longitudinally between a first intermediate tube end and a second intermediate tube end;
said intermediate tube includes a first intermediate tube opening and a second intermediate tube opening that extend radially through said intermediate tube;
an intermediate channel disposed radially between said intermediate tube and said inner tube;
a reservoir chamber disposed radially between said intermediate tube and said outer tube;
a base valve assembly including a base valve body and a base valve, said base valve body having projections that abut said second outer tube end to define a fluid transport chamber positioned between said second outer tube end and said base valve body;
a slanted elliptical seal that is positioned inside said intermediate channel and divides said intermediate channel into a first intermediate channel portion and a second intermediate channel portion;
a first control valve arranged in fluid communication with said second intermediate channel portion via said first intermediate tube opening, said first control valve has a first control valve inlet and a first control valve outlet;
a second control valve arranged in fluid communication with said first intermediate channel portion via said second intermediate tube opening, said second control valve has a second control valve inlet and a second control valve outlet; and
said slanted elliptical seal is positioned at an oblique angle relative to said longitudinal axis such that said slanted elliptical seal abuts said intermediate tube between said first intermediate tube opening and said first intermediate tube end and abuts said intermediate tube between said second intermediate tube opening and said second intermediate tube end.

11. The damper of claim 10, wherein said first intermediate channel portion is arranged in fluid communication with said first working chamber via at least one first working chamber opening and said second intermediate channel portion is arranged in fluid communication with said second working chamber via at least one second working chamber opening.

12. The damper of claim 11, wherein a compression flow path is defined when said first control valve is opened and said piston moves toward said second inner tube end where fluid in said second working chamber flows through said piston valve of said piston assembly to said first working chamber, fluid in said second working chamber also flows to said second intermediate channel portion via said second working chamber opening, fluid in said second intermediate channel portion flows to said first control valve inlet, and from said first control valve outlet to said reservoir chamber.

13. The damper of claim 11, wherein an extension flow path is defined when said second control valve is opened and said piston moves toward said first inner tube end where fluid in said first working chamber flows to said first intermediate channel portion via said first working chamber opening, fluid in said reservoir chamber flows through said base valve of said base valve assembly to said second working chamber, fluid in said first intermediate channel portion flows to said second control valve inlet, and from said second control valve outlet to said reservoir chamber.

14. The damper of claim 10, wherein said slanted elliptical seal includes an O-ring seal, a first support ring, and a second support ring such that said O-ring seal is disposed longitudinally between said first and second support rings in an abutting arrangement.

15. The damper of claim 14, wherein said slanted elliptical seal includes a slanted elliptical seal body that extends annularly about said inner tube and includes a slanted elliptical groove that receives said O-ring seal.

16. A damper, comprising:
an inner tube extending longitudinally between a first inner tube end and a second inner tube end along a longitudinal axis;
a piston assembly including a piston slidably disposed within said inner tube to define a first working chamber and a second working chamber;
an outer tube disposed annularly around said inner tube and extends longitudinally between a first outer tube end and a second outer tube end;
a first cover member attached to said outer tube such that a first collector chamber is defined between said first cover member and said outer tube;
a first control valve externally mounted to said first cover member, said first control valve has a first control valve inlet and a first control valve outlet;
a second cover member attached to said outer tube and such that a second collector chamber is defined between said second cover member and said outer tube;
a second control valve externally mounted to said second cover member, said second control valve has a second control valve inlet and a second control valve outlet;
an intermediate tube disposed annularly about said inner tube and positioned radially between said inner tube and said outer tube;
said intermediate tube extends longitudinally between a first intermediate tube end and a second intermediate tube end;

said intermediate tube includes a first intermediate tube opening and a second intermediate tube opening that extend radially through said intermediate tube;

an intermediate channel disposed radially between said intermediate tube and said inner tube;

a reservoir chamber disposed radially between said intermediate tube and said outer tube;

a slanted elliptical seal that is positioned inside said intermediate channel and divides said intermediate channel into a first intermediate channel portion and a second intermediate channel portion;

said first control valve arranged in fluid communication with said second intermediate channel portion via said first intermediate tube opening;

said second control valve arranged in fluid communication with said first intermediate channel portion via said second intermediate tube opening; and said slanted elliptical seal is positioned at an oblique angle relative to said longitudinal axis such that said slanted elliptical seal abuts said intermediate tube between said first intermediate tube opening and said first intermediate tube end and abuts said intermediate tube between said second intermediate tube opening and said second intermediate tube end.

17. The damper of claim 16, further comprising:
an intake valve assembly positioned within said outer tube to define an accumulation chamber that is arranged in fluid communication with said first and second collector chambers;

said intake valve assembly including:
a first intermediate chamber disposed in fluid communication with said first and second collector chambers,
a second intermediate chamber disposed in fluid communication with said second working chamber and said first and second collector chambers,
a central passage that extends longitudinally through the intake valve assembly and that is arranged in fluid communication with the second intermediate chamber and the second working chamber,
a first intake valve that controls fluid flow between said first intermediate chamber and said reservoir chamber, and
a second intake valve that controls fluid flow between said first and second intermediate chambers.

18. The damper of claim 17, wherein said first intermediate channel portion is arranged in fluid communication with said first working chamber via at least one first working chamber opening and said second intermediate channel portion is arranged in fluid communication with said second working chamber via at least one second working chamber opening.

19. The damper of claim 18, wherein a compression flow path is defined when said first control valve is opened and said piston moves toward said second inner tube end where fluid in said second working chamber flows to said second intermediate channel portion via said second working chamber opening in said inner tube, fluid in said second intermediate channel portion flows into said first control valve inlet and out into said first collector chamber via said first control valve outlet, fluid flows from said second working chamber through said central passage into said second intermediate chamber, fluid in said second intermediate chamber flows into said first collector chamber, fluid in said first collector chamber flows into said accumulation chamber and into said first intermediate chamber, when a pressure differential between said first intermediate chamber and said reservoir chamber exceeds a pressure threshold, said first intake valve will open and fluid will flow through said first intake valve and into said reservoir chamber.

20. The damper of claim 18, wherein an extension flow path is defined when said second control valve is opened and said piston moves toward said first inner tube end where fluid in said first working chamber flows to said first intermediate channel portion via said first working chamber opening, fluid in said first intermediate channel portion flows into said second control valve inlet and out into said second collector chamber via said second control valve outlet, fluid in said accumulation chamber flows into said second collector chamber, fluid in said second collector chamber flows to said first intermediate chamber, fluid in said first intermediate chamber flows to said second intermediate chamber via said second intake valve, fluid in said second intermediate chamber flows to said central passage, and fluid in said central passage flows to said second working chamber.

* * * * *